United States Patent [19]

Smith et al.

[11] Patent Number: 4,972,284
[45] Date of Patent: Nov. 20, 1990

[54] DEPOSITED PERMANENT MAGNET FOR HARD AND EASY AXES BIASING OF A MAGNETORESISTIVE HEAD

[75] Inventors: Neil Smith, San Diego; John R. Shelor, La Jolla, both of Calif.

[73] Assignee: Eastman Kodak Company, Rochester, N.Y.

[21] Appl. No.: 292,708

[22] Filed: Jan. 3, 1989

[51] Int. Cl.$^5$ .............................................. G11B 5/39
[52] U.S. Cl. ................................................. 360/113
[58] Field of Search .................... 360/113; 338/32 R; 324/252

[56] References Cited

U.S. PATENT DOCUMENTS

| | | | |
|---|---|---|---|
| 4,034,414 | 7/1977 | Kaminaka et al. | 360/113 |
| 4,277,808 | 7/1981 | Nagaki | 360/113 |

FOREIGN PATENT DOCUMENTS

| | | | |
|---|---|---|---|
| 0066413 | 3/1987 | Japan | 360/113 |
| 0137713 | 6/1987 | Japan | 360/113 |
| 1437008 | 5/1976 | United Kingdom | 360/113 |

Primary Examiner—D. J. Severin
Attorney, Agent, or Firm—Dennis P. Monteith

[57] ABSTRACT

A previously disclosed "C" shaped thin film deposited permanent magnetic structure of essentially symmetrical form is designed to provide a planar region of transverse field with little or no longitudinal field component. Practice of the present invention teaches asymmetrically modifying the "C" shaped magnet to restore a small controlled amount of unidirectional longitudinal field component. The symmetry is broken by either angling the direction of magnetization of the magnet relative to the symmetric geometric form of the structure, or by angling the direction of the magnetization and also changing the geometric shape of the magnet from a "C" shape to an "L" shape.

The resultant field distribution of the deposited asymmetrical magnetic structure produces a magnetic field of sufficient strength for biasing the hard axis of a coplanarly deposited MR element with an additional relatively smaller magnitude unidirectional easy axis field for longitudinally biasing it.

The hard axis bias field magnitude decreases across the width of the magnetoresistive element. Thus, as the head wears and the magnetoresistive element resultantly decreases in width, the average hard axis field across the element increases in magnitude, automatically compensating for the increasing demagnetization fields in the magnetoresistive element.

14 Claims, 4 Drawing Sheets

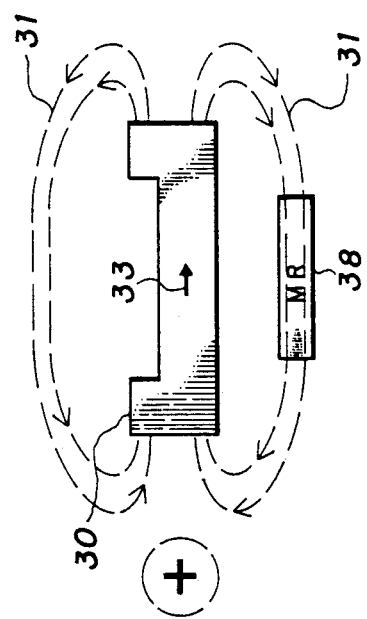
FIG. 3c
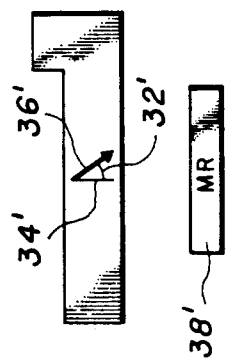
FIG. 3d
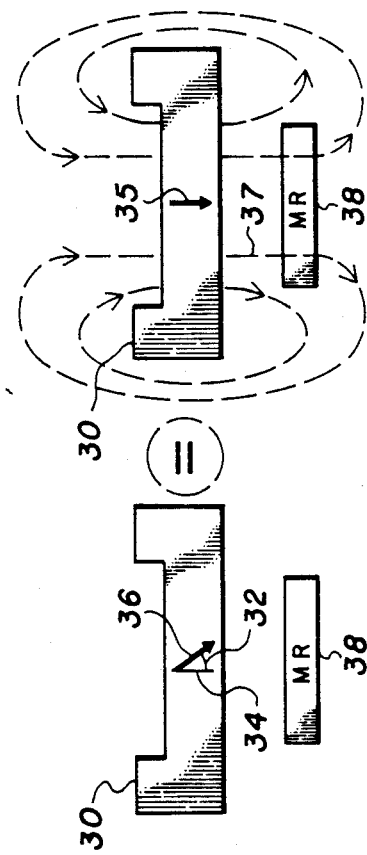
FIG. 3b
FIG. 3a

DEPOSITED PERMANENT MAGNET FOR HARD AND EASY AXES BIASING OF A MAGNETORESISTIVE HEAD

BACKGROUND OF THE INVENTION

1. Field of the Invention

This invention relates to a deposited thin film permanent magnet for biasing a magnetoresistive (MR) reproduce head, and in particular, a deposited thin film magnet which provides both hard axis and easy axis biasing.

2. Description Relative to the Prior Art

Figure 1:
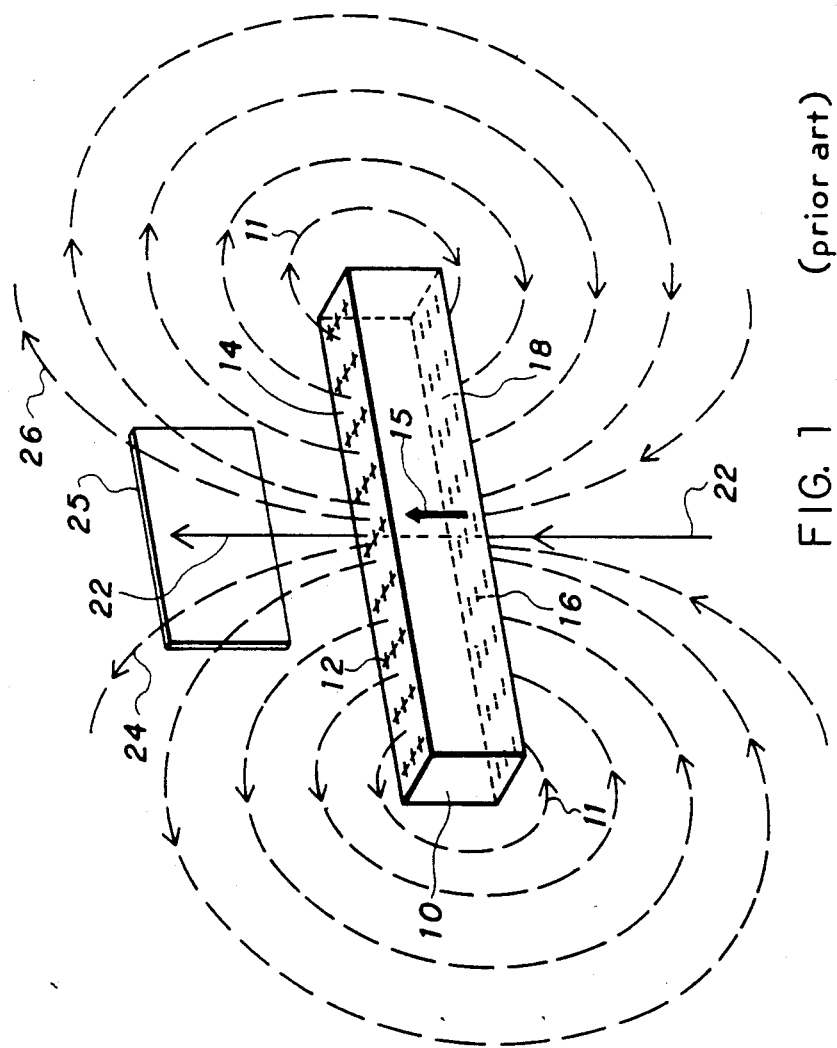
Figure 2:
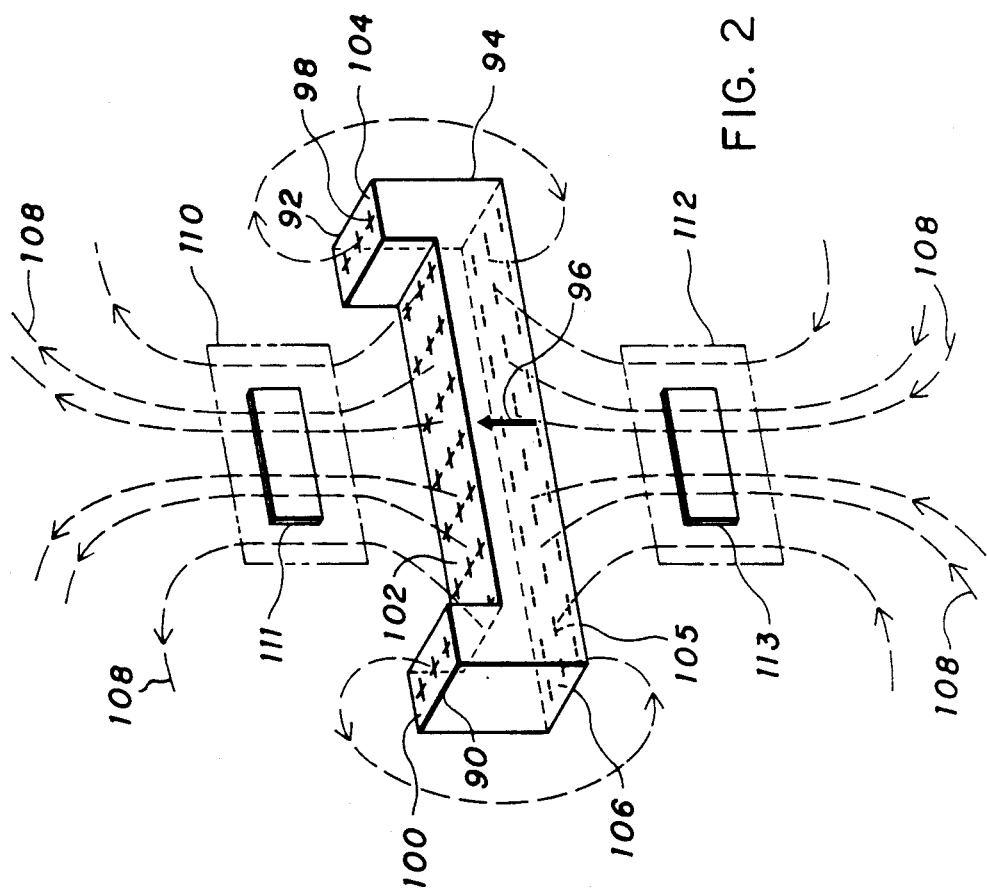
Figures 4A, 4B:
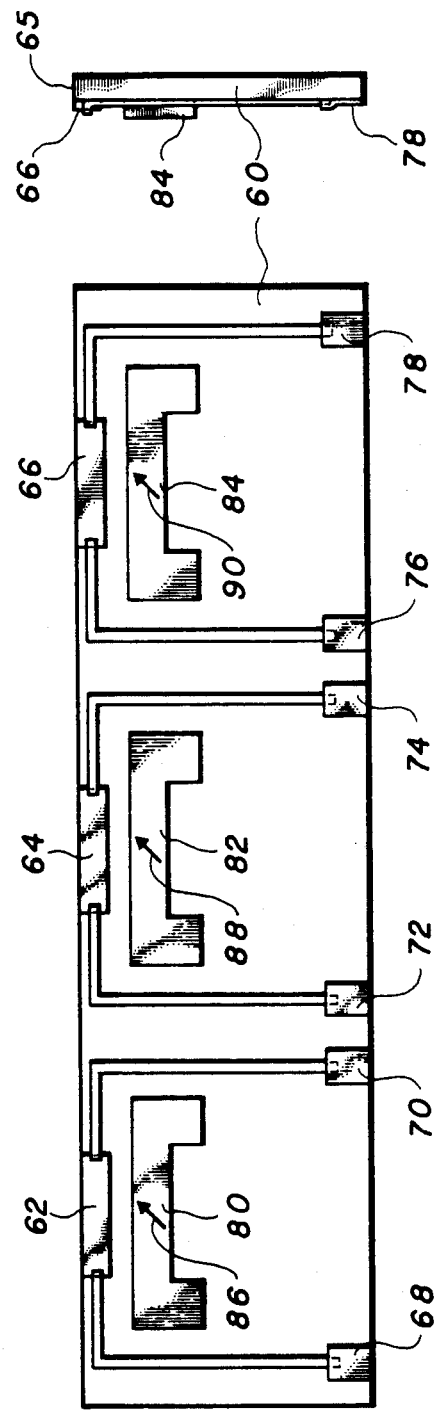

The invention, as well as the prior art, will be described with reference to the figures, of which:

FIG. 1 is a perspective drawing of a bar magnet and its associated magnetic field known in the prior art, FIG. 2 is a perspective drawing of a modified magnet having regions of uniform magnetic field, FIG. 3a, 3b, 3c are schematic representations of a magnet and its associated field according to the present invention, FIG. 3d is a drawing of a magnet according to a second embodiment of the present invention, and FIG. 4a, 4b are top and side views of a multitrack magnetoresistive head incorporating one embodiment of the magnet of the present invention. The MR head is an important component in modern magnetic recording/reproducing systems. With the current emphasis on higher data packing densities, thin film deposited head technology is capable of multitrack head fabrication with very high track densities, and the MR head is particularly suitable to thin film deposition techniques. Not only may the MR elements serving as the active tracks of a multitrack head be deposited, but a permanent magnet for biasing the MR elements may also be deposited. A permanent magnet, either a bulk magnet or a deposited magnet, so shaped to provide a uniform hard axis bias field across the MR element length in either a single track or multitrack MR head, is disclosed in U.S. application Ser. No. 288,926, filed in the name of Neil Smith and assigned to the same assignee as the instant application.

In addition to requiring magnetic bias along the hard axis of the MR element, it is known in the art that signal to noise of an MR head deteriorates when there is movement of domain walls in the signal detecting MR element. Domain wall movement arises when the MR element consists of multiple domains rather than a single domain, and it is known in the art that a small unidirectional magnetic field directed along the easy axis of the MR element is effective in inhibiting multiple domain formation. U.S. Pat. No. 4,547,824 discusses the use of a magnetic field along the MR element easy axis to inhibit multiple domain formation, and discloses means for obtaining an easy axis field. The key requirement of the easy axis field is that it be unidirectional across the MR element. It need not be uniform, in fact, as disclosed in U.S. application Ser. No. 225,418 now U.S. Pat. No. 4,903,158 in the name of Neil Smith and assigned to the assignee of the instant application, an easy axis field shaped to oppose the demagnetization field at the edges of the MR element is desireable. U.S. application Ser. No. 225,416, now U.S. Pat. No. 4,889,240 in the name of R. J. McClure and assigned to the assignee of the instant application, addresses the problem of providing both a hard axis bias field and an easy axis bias field by means of a single permanent bar magnet.

In general, it is to be noted that magnets of the prior art, deposited or otherwise, are either not located in the plane of the MR element or are located at a considerable distance (compared to the linear dimensions of the MR element) from the MR element being biased.

One problem which may arise under prior art solutions which utilize a single, compactly sized, permanent bar magnet is that the bias field is not uniform in direction over the MR element. If the region occupied by the MR elements of, say, a many track MR head is larger than the uniform region at the bar magnet's central region, the above non uniform condition will occur. Referring to FIG. 1, a permanent bar bulk magnet 10, in the shape of a rectangular parallelepiped and uniformly magnetized 15 in the direction of its height, has field lines originating on positive magnetic charges 12 on one face 14 of the magnet 10, and terminating on minus magnetic charges 16 on an opposite face 18. (In the following discussion both bulk bar magnets and deposited magnets will be considered. It is believed advantageous to define the following terms related to such magnets. For bulk magnets, following common practice, the longest dimension of the magnet is designated as "length" and the two mutually orthogonal shorter dimensions are designated as "height" and "width". In discussing thin film deposited magnets it is assumed that the height (thickness) of the film is small and that the deposited magnet is described only in terms of its length and width, of which, "length" is the longer dimension. Also, as is understood and accepted in the art, the term magnetic "charge" is a convenient fiction to represent the normal component of the magnetization at the surface where the "charge" is said to exist.) Lines 11 are typical external magnetic field lines of the magnet 10. It will be seen that the field lines are symmetrical with respect to a plane perpendicular to the faces 14,18 and bisecting the length of the magnet 10. Except for the field line 22, the field lines all diverge as they leave the face 14 and as they engage the face 18. When used for biasing an MR element, it is necessary that the MR element 25 be located in a region where the longitudinal field component necessary for overcoming easy axis domain formation is unidirectional through the element. This means placing the MR 25 element away from the central region of the magnet 10, otherwise the longitudinal field components intercepted by the element will lie in opposite directions as is clear by considering the field lines 24,26. When moving the MR element 25 away from the center of the magnet 10, however, the hard and easy axis components of the field become progressively smaller and larger respectively, over the length (i.e., track width) of the MR element, and optimal signal reproduction capability is compromised.

Application 288,926 referred to above discloses a magnetic "C" shaped structure that provides an extended region of uniform hard axis bias field along the MR element length. This field is free of longitudinal components, and is achieved without unduly lengthening the magnetic structure. Referring to FIG. 2, the ends 90,92 of a bulk bar magnet 94 have increased widths compared to the width in the central region of the bar magnet 94. The magnet 94 is uniformly magnetized 96 in its width direction, with resultant plus magnetic charges 98 appearing on the surfaces 100,102,104 and minus magnetic charges 105 appearing on the opposite surface 106. Because the ends 90,92 of the magnet 94 have been widened, a portion of the positive charge 98 is displaced at the ends 90,92 compared to the charge present on the conventional uniformly wide bar magnet. The displaced charge modifies the field direction, and the lines of force 108 emanating from the magnet surfaces 100,102,104 initially converge rather than diverge as they leave the magnet 94. With increasing distance from the magnet 94 the lines 108 begin to diverge, but in the transition region 110 between convergence and divergence of the field lines 108, the field lines are substantially straight and parallel without appreciable longitudinal components, i.e. the field is relatively uniform in direction. Similarly, as the lines 108 terminate on the minus charge 105 on the surface 106, they also change from being divergent to being convergent with an attendant region 112 containing a substantially uniform field. It will be appreciated than either an MR element 111 placed in the region 110, or an MR element 113 placed in the region 112 will experience a uniform hard axis bias field.

While the magnet of FIG. 2 is shown and described in its most general form of a three dimensional structure, it will be appreciated that a corresponding thin film deposited magnet essentially having length and width and of small height will exhibit corresponding diminished longitudinal field components in the effective planar regions corresponding to the regions 110 and 112 of its three dimensional counterpart of FIG. 2.

The present invention improves on the above described "C" shaped structure when configured as a thin film deposited magnet, providing at the MR element an extended transverse region of hard axis bias field relatively uniform in magnitude over the MR element's length while simultaneously providing a unidirectional longitudinal field for easy axis biasing. The preferred embodiment of the invention is in the form of a thin film deposited magnet, where the size of the magnet is somewhat larger than the MR element and it's field distribution is such that the deposited magnet may be located in the plane of, and adjacent to, the MR element which it biases.

SUMMARY OF THE INVENTION

A previously disclosed "C" shaped thin film deposited permanent magnetic structure of essentially symmetrical form is designed to provide a planar region of transverse field with little or no longitudinal field component. Practice of the present invention teaches asymmetrically modifying the "C" shaped magnet to restore a small controlled amount of unidirectional longitudinal field component. The magnetic symmetry is broken by either angling the direction of magnetization of the magnet relative to the symmetric geometric form of the structure, or by angling the direction of the magnetization and also changing the geometric shape of the magnet from a "C" shape to an "L" shape.

The resultant field distribution of the deposited asymmetrical magnetic structure produces a magnetic field of sufficient strength for biasing the hard axis of a coplanarly deposited MR element with an additional relatively smaller magnitude unidirectional easy axis field for longitudinally biasing it.

The hard axis bias field magnitude, while substantially uniform along the length of the magnetoresistive element, decreases across its width. Thus, as the head wears and the MR element resultantly decreases in width, the average hard axis field across the element increases in magnitude, automatically compensating for the increasing demagnetization fields in the MR element. This compensation precludes the loss of MR element sensitivity due to a deficit of sufficient bias field caused by increasing demagnetization fields in the magnetoresistive element.

Additionally, the longitudinal easy axis field provided by the deposited magnet has the desireable property of being larger at the longitudinal ends of the MR element and weaker in the active middle region of the element. This occurs, because as will be described below, the MR element lies parallel to the magnet length, and because the magnitude of the longitudinal field of the magnet is greater towards the magnet ends. Because of their proximity to the magnet ends, the longitudinal ends of the MR element experience greater field magnitudes than the center of the MR element. As explained in U.S. application No. 225,418, this gives rise to increased single domain stability without loss of signal detecting sensitivity.

DESCRIPTION OF THE INVENTION

Referring to FIG. 3a, a "C" shaped thin film planarly deposited magnet 30, corresponding in geometry to the bulk structure shown in FIG. 2, is uniformly magnetized in the thin film plane to provide a magnetization 36 at an angle 32 with the width direction 34 of the magnet 30. If the magnetization vector 36 is considered in terms of its transverse and longitudinal components, then FIG. 3b shows the transverse component 35 of the magnetization 36 lying along the width direction 34 of the magnet 30. It will be noted that the configuration of FIG. 3b is the magnetic configuration shown in FIG. 2 with its resultant region of transverse field 37 with substantially no longitudinal component present, into which an MR element 38 may be placed for hard axis biasing. FIG. 3c, on the other hand, illustrates the resultant external field due to the longitudinal component of the magnetization 36 acting on the same magnetic structure 30. The resulting field lines 31 are effectively those of a bar magnet magnetized in the direction of its length, and it will be noted the magnet is characterized by a unidirectional longitudinal field in its center regions where the MR element 38 has been located. By the principle of superposition well known in the art, therefore, the overall field obtained by magnetizing the structure of FIG. 3a at the angle 32 is just the sum of the hard axis field obtained in FIG. 3b plus the easy axis field obtained in FIG. 3c which result from the transverse component 35 of the magnetization 36 and longitudinal component 33 of the magnetization 36, respectively. Thus the structure of FIG. 3a, when magnetized at the angle 32 with the resulting breaking of the magnetic symmetry of the structure, is capable of simultaneously biasing an MR element along the hard axis, while also providing unidirectional easy axis biasing.

It should be noted that the position of the MR element 38 in the deposited magnet case under discussion is considerably closer to the deposited magnet than the element 111 is to the bulk magnet of FIG. 2. Resultantly, the magnitude of the hard axis field of the magnet 90 of FIG. 2 is more uniform through the width of the MR element than that of the deposited magnet 30 of FIGS. 3a, 3b. Because of the proximity of the deposited magnet of FIGS. 3a, 3b to the MR element 38, there is a gradient in the hard axis field magnitude along the MR element width. The field magnitude is greater at the MR element nearer the magnet 30 than on the side of the MR element away from the magnet 30. As the MR element 38 wears and its width decreases, geometrically dependent demagnetization fields of the element increase, and these increasing demagnetization fields would, if the bias field were of uniform magnitude, continue to de-bias the element, reducing its sensitivity as a signal detector. Therefore, the above mentioned hard axis field gradient tends to cancel out the increasing demagnetization fields under wear conditions, because the average value of the hard axis field throughout the volume of the MR increases as the MR element wears. Attendantly, as previously described, this maintains the magnetoresistive element sensitivity.

In a second embodiment of the invention, enhancement of the longitudinal easy axis field may be effected by changing the geometric structure from a "C" shape to an "L" shape. Referring to FIG. 3d, for the direction of magnetization 36' as seen in FIG. 3d, removal of the left "tab" of the magnet breaks the geometric symmetry of the magnet with a consequent increase of the easy axis bias and without materially degrading the characteristics of the hard axis field described above for "C" shaped magnet. In general, for the deposited magnet shape of FIG. 3d, and with the positive directive of angle 32' increasing for the magnetization 36' as shown, then for angles between 0 and 90 degrees or 180 and 270 degrees, the left "tab" is removed: for angles 32' between 90 and 180 degrees or 270 and 360 degrees, the right "tab" is removed.

Referring to FIGS. 4a and 4b, a multitrack magnetoresistive head in accordance with the invention comprises three MR elements 62,64,66 deposited on a substrate 60. Deposited leads 68,70 are attached to MR element 62, deposited leads 72,74 are attached to MR element 64, and deposited leads 76,78 are attached to MR element 66 for the purpose of conducting externally generated sense currents through the MR elements for signal recovery, as is well known in the art. "C" shaped thin film magnets 80,82,84, in accordance with the teachings of the invention, are deposited adjacent to, and co-planarly with, the MR elements 62,64,66 on the substrate 60. Magnets 80,82,84 are deposited, using materials such as CoPt, or CoSm, following the practices of the art. As deposited, CoPt or Co Sm film magnets are isotropic with no preferred direction of magnetization. After completion of head fabrication, the head is placed in a strong external field which magnetizes the thin films 80,82,84, and the magnetizations 86,88,90 of the resultant thin film magnets 80,82,84 then lie in the direction determined by the direction of the external magnetizing field. The direction of magnetization is selected to break the magnetic symmetry of the magnets 80,82, 84 as taught by the invention, and to provide the magnitudes of hard and easy axis biasing required for the specific application. Deposited magnet 80 provides hard and easy axis biasing for the MR element 62, while magnets 82 and 84 similarly bias the MR elements 64,66, respectively.

Referring to FIG. 4b, it is seen that while the thicknesses of a deposited thin film MR element, e.g., 66, may not be equal to the thickness of a deposited thin film magnet, e.g. 84, both the magnet and the MR element are commonly deposited on the substrate surface 60 and, both, being extremely thin, are essentially co-planar.

In the final head structure, the edge 65 of the substrate 60 is lapped to expose edges of the MR elements 62,64,66, for contact with the magnetic medium travelling in a plane perpendicular to that of the substrate 60.

The invention has been described in detail with particular reference to preferred embodiments thereof, but it will be understood that variations and modifications can be effected within the spirit and scope of the invention.

What is claimed is:

1. An improved thin film deposited magnetoresistive head comprising a non magnetic substrate and a rectangular magnetoresistive element deposited on said substrate, said magnetoresistive element having hard and easy axes therein, wherein the improvement comprises:
   a. a deposited magnetically isotropic structure proximate said magnetoresistive element, said magnetically isotropic structure having a rectangular center section and end tabs extending in the width direction therefrom, whereby said magnetically isotropic structure has a "C" shape, and
   b. means for magnetizing said magnetically isotropic structure to provide a permanent magnet, said magnet having a substantially uniform first field component for biasing said hard axis of said magnetoresistive element, and said magnet having a unidirectional second field component for biasing said easy axis of said magnetoresistive element.

2. The improved magnetoresistive head of claim 1 wherein said means for magnetizing said magnetically isotropic structure induces permanent magnetization in said magnetically isotropic structure to produce said permanent magnet, wherein the direction of said magnetization is inclined at an angle with respect to the width direction of said magnet.

3. The improved magnetoresistive head of claim 2 wherein said magnet is deposited on said substrate, whereby said magnet is coplanar with said magnetoresistive element.

4. The improved magnetoresistive head of claim 3 wherein a longitudinal edge of said magnetoresistive element is adjacent to, and parallel to the edge of said rectangular center section of said magnet which is away from the interior portion of said "C" shape.

5. The improved magnetoresistive head of claim 4 wherein said magnetoresistive element is centered relative to the ends of said rectangular center section of said magnet.

6. An improved thin film deposited magnetoresistive head comprising a non magnetic substrate and a rectangular magnetoresistive element deposited on said substrate, said magnetoresistive element having hard and easy axes therein, wherein the improvement comprises:
   a. a deposited magnetically isotropic structure proximate said magnetoresistive element, said magnetically isotropic structure having a rectangular center section and one end tab extending in the width direction therefrom, whereby said magnetically isotropic structure has an "L" shape, and
   b. means for magnetizing said magnetically isotropic structure to produce a permanent magnet, said magnet having a substantially uniform first field component for biasing said hard axis of said magnetoresistive element, and said magnet having a unidirectional second field component for biasing said easy axis of said magnetoresistive element.

7. The improved magnetoresistive head of claim 6 wherein said means for magnetizing said magnetically isotropic structure induces permanent magnetization in said magnetically isotropic structure to produce said permanent magnet, wherein the direction of said magnetization is inclined at an angle with respect to the width direction of said magnet.

8. The improved magnetoresistive head of claim 7 wherein said magnet is deposited on said substrate, whereby said magnet is coplanar with said magnetoresistive element.

9. The improved magnetoresistive head of claim 8 wherein a longitudinal edge of said magnetoresistive element is adjacent to, and parallel to the edge of said rectangular center section of said magnet which is away from said edge and said tab that form said "L" shape.

10. The improved magnetoresistive head of claim 9 wherein said magnetoresistive element is centered relative to the ends of said rectangular center section of said magnet.

11. A magnetoresistive reproduce head comprising:
a. a non magnetic substrate,
b. a track defining magnetoresistive element deposited on said substrate,
c. a "C" shaped magnetically isotropic structure deposited on said substrate adjacent to said magnetoresistive element, and
d. means for magnetizing said magnetically isotropic structure to induce permanent magnetization in said magnetically isotropic structure to provide a permanent magnet, wherein the direction of said magnetization is at an angle relative to the width of said magnet, whereby substantially uniform hard axis bias and unidirectional easy axis bias are provided to said magnetoresistive element.

12. The magnetoresistive head of claim 11 wherein said magnetically isotropic structure is deposited CoPt.

13. A magnetoresistive reproduce head comprising:
a. a non magnetic substrate,
b. a track defining magnetoresistive element deposited on said substrate,
c. an "L" shaped magnetically isotropic structure deposited on said substrate adjacent to said magnetoresistive element, and
d. means for magnetizing said magnetically isotropic structure to induce permanent magnetization in said magnetically isotropic structure to provide a permanent magnet, wherein the direction of said magnetization is at an angle relative to the width of said magnet, whereby substantially uniform hard axis bias and unidirectional easy axis bias are provided to said magnetoresistive element.

14. The magnetoresistive head of claim 13 wherein said magnetically isotropic structure is deposited CoPt.

* * * * *